UNITED STATES PATENT OFFICE.

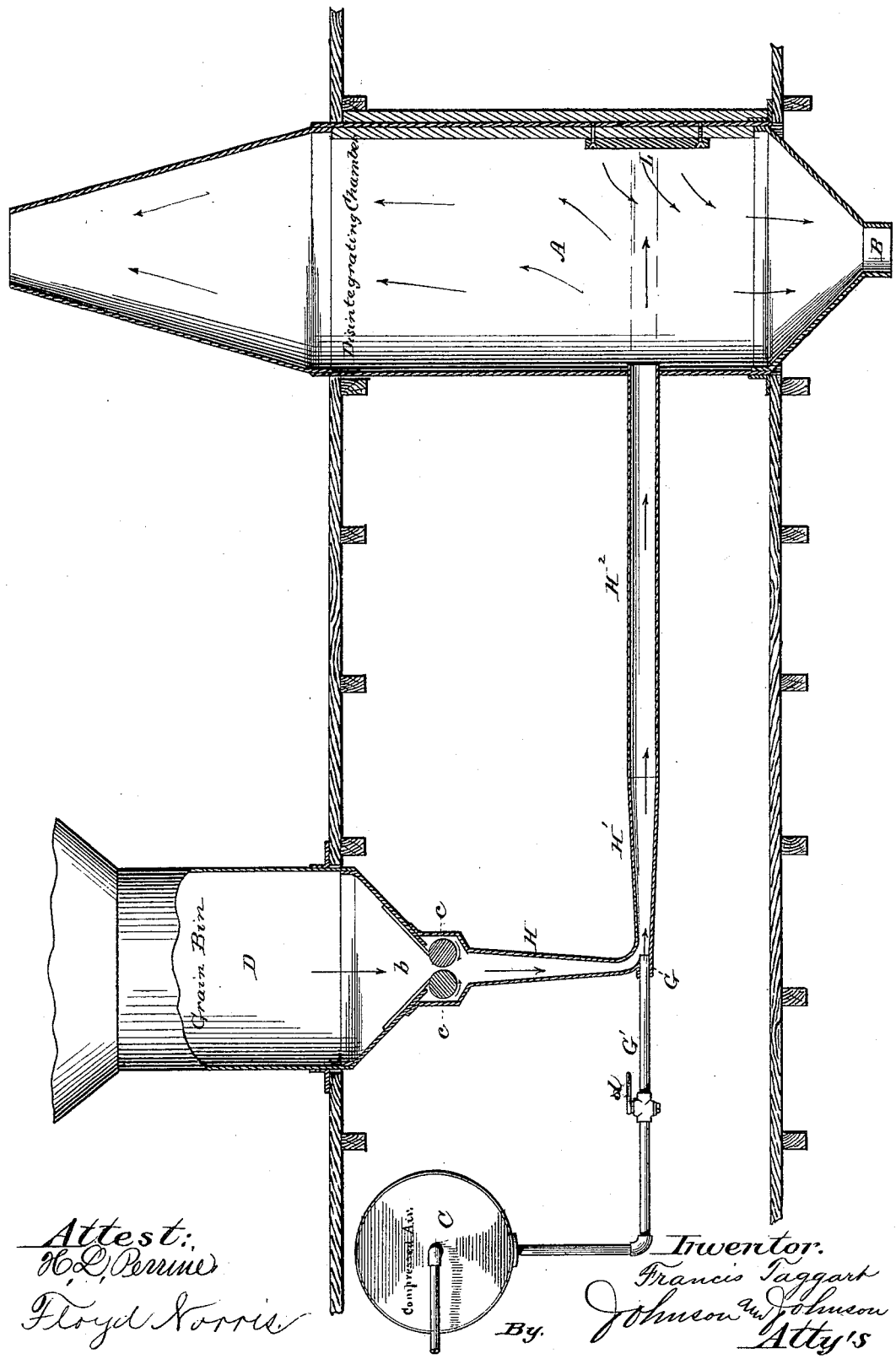

FRANCIS TAGGART, OF BROOKLYN, NEW YORK, ASSIGNOR TO CHARLES R KNICKERBOCKER, TRUSTEE.

MACHINE FOR DISINTEGRATING WHEAT, &c.

SPECIFICATION forming part of Letters Patent No. 269,741, dated December 26, 1882.

Application filed May 25, 1880. (No model.)

*To all whom it may concern:*

Be it known that I, FRANCIS TAGGART, a citizen of the United States, residing at Brooklyn, in the county of Kings and State of New York, have invented new and useful Improvements in Machines for Disintegrating Wheat and other Grain and Substances, of which the following is a specification.

In a patent granted to me April 18, 1881, No. 248,528, for process and apparatus for disintegrating wheat, &c., I have described and claimed a process for disintegrating cereals and other frangible substances, and an apparatus for carrying the process into effect. The said process in brief consists in projecting the grains to be comminuted against a hard abutment or obstacle by the agency of a continuously-flowing powerful current of aeriform fluid, (usually compressed air,) into which the grains are introduced at a convenient point, whereby the latter are disintegrated, and then collecting the comminuted particles, while the accumulation of air is permitted to escape at a different point.

My present improvement is to effect the same object or purpose; and it consists in features of construction and of combination in apparatus specially adapted for effecting the disintegration of grain or other frangible substances to the desired degree of fineness of granules by being shattered against a hard abutment by the impelling force of a continuously-flowing jet of air from an ejector. In my said patent the feed of the substance is shown as being effected by the inactive function of a regulating-slide, which can only be set to regulate the quantity of the substance descending by gravity only, whereas in my present improvement the feed is effected from an open bin direct to the ejector-orifice by the mechanical forcing function of revolving or moving surfaces. The feed is continuous, descending by gravity direct to the nozzle of the ejector at a point just in front of the ejector-orifice and at the junction of the vertical feed-pipe with the horizontal projecting-pipe.

In disintegrating frangible substances by the prime impact of the grains or particles against a hard abutment or surface of impact, with a continuously-flowing powerful current or jet of air upon a continuous feed, it is a matter o great importance that the feed should be suc1 that the grain or substance will be projectec with uniformity and regularity as to volume or body to produce the best results. In the present arrangement of the apparatus the feed rolls are placed directly over the ejector-orifice and the latter enters the projecting pipe at a point forward of the entrance of the materia therein, whereby the force of the air-jet act upon the substance at its point of entrance in said projecting pipe and drives it forward. The vertical pipe in which the feed-rolls are ar ranged and the horizontal projecting pipe fo the substance flare about equally from the ejector-orifice. This gives a comparatively nar row passage for the substance at the jet-noz zle, and allows the air to expand and to main tain its full velocity in flowing through a cy lindrical part of said projecting pipe.

I have illustrated in the accompanying draw ing one form of apparatus embracing my pres ent improvements, and which represents a ver tical sectional view of the organized apparatu in its relation to the floor of the mill.

The grain or other substance is projectec into a chamber, A, wherein it is disintegratec to the desired measure by a single impinge ment, and the shattered particles confined and discharged therefrom. This chamber may b of any suitable form, size, and construction and arranged in relation to bolting and sift ing machines, to separate the bran skins fron the granular flour-producing substance, and to suitable flour-producing apparatus, all of whic1 may or may not be connected to and commu nicate with the discharge chute or spout E which I prefer to form as a continuation of th hopper bottom of said chamber. A chambei C, serves to receive air under accumulate pressure, and should be of capacity to affor a steady pressure and supply of compresse air to the ejector. Its strength should be su! ficient to bear with safety a pressure of tw hundred and twenty-five pounds, more or les: to the square inch. The ejector is connectec with and extends directly from this compresse air-chamber, and joins a pipe which enters th reducing-chamber. The grain is fed dowi d to the ejector from an open bin, D, which
rovided with a suitable hopper discharge
, b, and with rolls c c, of suitable diam-
·, and properly arranged to effect the feed
he grain to the ejector in regulated quanti-
. They are preferably adapted to be re-
·ed upward or in a direction contrary to
feed of the grain. These feed-rolls are
vided with slides or scrapers, secured to
inclined sides of the hopper end of the bin
made adjustable in relation to the rolls,
le the feed is effected in quantities regu-
d by the adjustment and speed of the rolls.
he conducting and projecting pipe extends
n the hopper end of the bin downwardly a
able distance, and enters by a horizontal
·nsion the chamber A, in which the disin-
·ation of the grain or other substance is
:ted.
he ejector G proper should be about one-
·th of an inch in diameter, and the pipe G′,
necting it with the compressed air-cham-
. should be of sufficiently larger diameter
nsure that the velocity of the outflowing
at the exit shall be as near as can be to
greatest possible velocity that can be given
. jet of air by a pressure of two hundred
twenty-five pounds to the square inch.
ejector-nozzle G joins the vertical feeding-
· H at its junction with the horizontal pro-
ing-pipe H′, and extends within the latter
past or in advance of the vertical opening
·ugh which the grain descends, so as to
se the substance to enter the projecting-
· and to be drawn therein along with a cur-
· of non-compressed air from the feeding-
· in the direction shown by the arrows.
re it not for this relation of the ejector-noz-
·ith the outlet of the vertical feeding-pipe
feed of the substance could not be effected
er a continuously-flowing powerful current
·t of air from the ejector-nozzle. The pro-
in'g-pipe should be about one-fourth greater
neter than the exit end of the ejector at this
:tion. The vertical feeding-pipe H and the
·ecting-pipe H′ flare about equally from the
tor, the pipe H′ increasing in diameter a
ance sufficient to allow for the full expan-
of the air, and from the termination of
· flaring part the sides of said pipe con-
e parallel the full diameter to its entrance
the disintegrating-chamber, so that the
velocity of the air may be maintained to
lischarge end.
prefer that the length of the parallel part
·hould be not less than forty times its di-
ter and the diameter of the parts H and
·t the point of communication should be
·l. The ejector joins the curved side of the
-pipe H and the end of the projecting pipe
so as to bring the ejector-nozzle in the re-
·n stated to the substance issuing from the
·r curved end of the feeding-pipe.
·pported upon the wall of or within the
·tegrating-chamber and at a point oppo-
to the entrance therein of the projecting-
pipe H² and in central line therewith and at
right angles to such line is a disk, L, of suit-
able diameter and thickness, of extremely hard
steel or other hard and proper substance with
preferably a polished surface of any form, bro-
ken or unbroken, forming an abutment or sur-
face of impingement against which the grain
kernels or substances are continuously pro-
jected with force sufficient to cause the whole
interior substance of the kernels to be disinte-
grated to the desired measure.

The shattered particles are confined within
and fall and pass out from the chamber in
which the abutment is arranged. This cham-
ber is so constructed as to allow sufficient free-
dom for the outward passage of the expanded
air from the ejector while retaining in the cham-
ber all or nearly all the products of disinte-
gration, whether such provision be made by
the use of a large and high inclosure of pyrami-
dal or conical form and having sufficient ca-
pacity to allow of a very slow ascent of the lib-
erated air to the small outlet at the top, thus
giving time for the subsidence of the fine and
lighter products of the disintegration, or by
forming the inclosing walls or surrounding
surface of the chamber of bunting or other per-
vious fibrous fabrics or of perforated metal of
such size of mesh or perforations as to allow
the air to pass outward while retaining within
the chamber nearly or quite all of the fine pro-
ducts of disintegration.

The ejector-pipe is provided with a suitable
cock or valve, d, by which to regulate and con-
trol the operation.

The apparatus is suitably supported, and
the supply of compressed air in the chamber
C or to the ejector is maintained by any suit-
able means.

The apparatus being completed for use, the
bin filled, and the compressed-air chamber
fully charged, the cock d is turned until a jet
of air of sufficient force is produced in the pro-
jecting-pipe. The feed-rolls are then given
the proper speed, and the grain or substance
passing through them in proper quantity will
descend partly by the force of gravity and
partly by the force of the air-current induced
by the air-jet, and meeting the ejector im-
pelling force will be thereby projected against
the fixed surface of impingement and disinte-
grated.

Any suitable compressor with proper eject-
or-connections may be used instead of cham-
ber C.

The outlet for the escape of the spent com-
pressed air from the disintegrating-chamber
may be made adjustable as to size and of such
height above the abutment and the bottom
outlet as to allow such time and space for the
separation and subsidence of the fine flour as
will prevent any considerable loss by flour-
dust passing out with the outflowing air, and
so that all the air entering the chamber will
pass out without causing any perceptible back-
pressure.

I have stated that the grain or substance should be projected with uniformity and regulated as to volume or body to produce the best results, and I mean by this that it should be fed to the ejector in unvarying quantity by a positively-moving feed regulated to suit the force of the air to the end that the cushioning action of one grain or particle upon another at the instant of impact upon the abutment will be lessened, the substance more uniformly reduced, and the expense attending such reduction materially lessened.

I claim—

1. The combination, with an air-ejector, a chamber for compressed air, an abutment, a chamber inclosing said abutment, and an open supply-bin, of a positively-moving feeder arranged with respect to the ejector substantially described, for the purpose specified.

2. In apparatus for disintegrating grain and other frangible substances, the combination of an air-ejector, a chamber for compressed air, an abutment, and a chamber inclosing said abutment, with an open supply-bin, feed-rolls $c\ c$, and feed-pipe H, arranged with respect to and having direct communication with said ejector and with the chamber inclosing said abutment, substantially as herein set forth.

3. The combination, with an air-ejector, a chamber for compressed air, an abutment, an inclosing-chamber therefor, a supply-bin, and the feed-rolls, of a feed-pipe and a projecting pipe, both flaring from the ejector-nozzle, substantially as described, for the purpose specified.

4. The combination, in apparatus for disintegrating grain and frangible substances, of an air-ejector, a chamber for compressed air, a hard abutment, an inclosing-chamber therefor, an open supply-bin, and the feed-rolls, with the vertical feed-pipe H and the horizontal projecting-pipe $H'\ H^2$, both joining the ejector-nozzle G and flaring equally therefrom, substantially as described, for the purpose specified.

In testimony whereof I have hereunto set my hand in the presence of two subscribing witnesses.

FRANCIS TAGGART.

Witnesses:
A. E. H. JOHNSON,
J. W. HAMILTON JOHNSON.